Sept. 5, 1967  S. BOHN  3,339,953
JOINT INCLUDING T-CONNECTOR
Filed May 24, 1965

INVENTOR.
Samuel Bohn
BY
*Irving Deidman*
ATTORNEY

United States Patent Office 3,339,953
Patented Sept. 5, 1967

3,339,953
JOINT INCLUDING T-CONNECTOR
Samuel Bohn, 285 Aycrigg Ave.,
Passaic, N.J. 07056
Filed May 24, 1965, Ser. No. 458,080
1 Claim. (Cl. 287—189.36)

This invention relates to a connector or securing means.

The connector of my invention provides greater area for gripping and anchoring abutting structural parts such as elements used in the fabrication of metal door assemblies, window frames and the like. It will also simplify and facilitate the interconnection of such parts.

In the present practice T-nuts have been used to anchor various parts of frame assemblies which bear against shoulders of the part to be anchored or attached. However, in many instances, such parts are not held tightly enough because the shoulder may not be sufficiently large or the head of the nut may be too small. Thus, the attached part may be loosened or torn away with jarring or pressure.

It is an object of this invention to provide a connector to give greater gripping area so that the anchored part will be held more firmly than heretofore when the screw used with the connector or T-nut is tightened. Because of the added gripping properties of my T-nut, smaller connectors may be used with the gripping advantages of larger T-nuts of this type.

To obtain the advantages of added gripping power for my connector, I have provided a groove cut between the shank and the head of the T-nut so that there is an added shoulder and surface in the part to be attached, against which the head and shank of the connector can grip and anchor.

Other objects, features and advantages of the invention will appear from the following disclosure in which.

Figure 2:
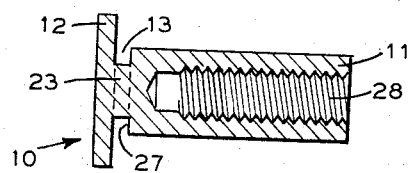
FIG. 2 is a longitudinal cross sectional view thereof taken through line 2—2 of FIG. 1.
Figure 3:
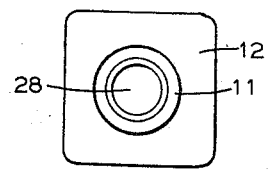
FIG. 3 is a front elevational view thereof.
Figure 1:
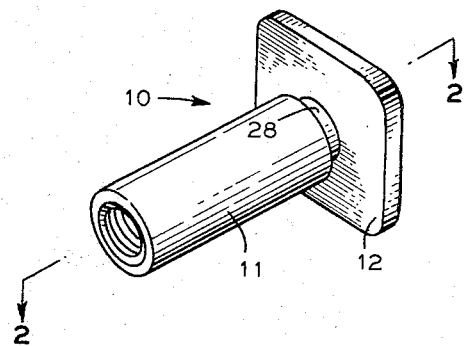
FIG. 1 is a perspective view of the connector or T-nut showing the groove between the shank and head of the present invention.

Referring to the drawing, my connector or T-nut 10 comprises a shank 11, a head 12 and a groove 13 between the said shank and head. Because of groove 13, the inner side or face of head 12 presents a surface larger than heretofore used, the purpose of which will be hereinafter described. Shank 11 has a threaded bore 28 therein.

Figure 4:
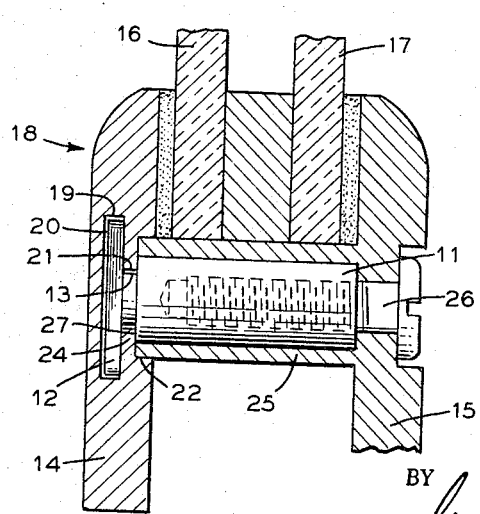
FIG. 4 is a cross sectional view through a portion of a refrigerator door frame showing the anchoring device or connector of my invention in position for effective use.

In FIG. 4 I have shown a typical use of my connector as it is used in anchoring an outer metal trim member 14 to an inner plastic trim member 15 to hold twin glass panels 16–17 in position within the frame 18. Trim member 14 has an inner groove 19 which comprises a large channel 20, a narrower intermediate channel 21 and a groove 22, thus providing an inwardly directed shoulder portion 24 between channel 20 and groove 22.

The large channel 20 receives the head 12 of the connector, the narrower intermediate channel receives the portion 23 of the connector between the head and shank and the groove 22 receives the shank 11 of the connector 10 and end of the shank 25 of the plastic trim 15.

When screw 26 is tightened within the hollow inwardly threaded shank 11, the head 12 is drawn against the inwardly directed shoulder portion 24 so that the trim 14 is held by the normally larger inner surface of the head 12 pressing against the large inwardly directed shoulder 24 which also presents an inward shoulder against the inner end of the shank 25 and the inner shoulder 27 of the groove 13. Thus, added gripping area or surface permits greater anchorage so that the trims 14 and 15 are held more tightly together than by the type of connector heretofore used which did not provide the groove between the head and shank of the connector.

The type of outer trim 14 used should be smooth without visible support and in certain applications it is desired to use small connectors. It will thus be seen that by providing greater gripping power, smaller connectors may be used than those heretofore employed.

While I have referred to trim 14 as made of metal and trim 15 as made of plastic material, it is to be understood that such trim may be made of other known material and that my connector need not be necessarily made of metal.

Furthermore, in describing the use of my connector, I referred to a type of frame used for sliding doors on refrigerators. However, it is also to be understood that my connector has many applications other than doors or frames of the type to which I have referred.

I claim:

In combination;

an outer frame member having an inner groove defining an enlarged channel disposed intermediate the thickness of said outer frame member, said outer frame member having a second groove defining a recess formed in a surface portion on the inner side of said outer frame member, said second groove formed on the inner surface of said outer frame member being concentrically disposed with respect to said inner groove, means defining an intermediate groove coaxially interconnecting said inner groove and said second groove whereby a shoulder is defined intermediate the thickness of said outer frame member, a T connector having a head portion and a connected stem portion, said head portion having a greater diameter than said stem portion, said head portion being received in said inner groove, and said stem portion having formed thereon an annular groove immediately adjacent said head whereby said annular groove defines a recess accommodating the shoulder defined intermediate the thickness of said outer frame, said stem portion having a threaded bore extending internally and longitudinally thereof, and an inner frame member connected to said outer frame member and associated T connector, said inner frame member having a hollow shank receiving the stem portion of said T connector, said hollow shank spacing the inner member from the outer member, said shank having its inner end received in said second groove formed on the inner surface of said outer frame member, and a screw connector received in the bore of said T connector drawing said inner and outer frame members together in the assembled position thereof.

References Cited

UNITED STATES PATENTS

| | | | |
|---|---|---|---|
| 779,288 | 1/1905 | Lane | 85—114 |
| 789,553 | 5/1905 | Lang | 85—114 |
| 2,246,457 | 6/1941 | Schultz | 85—114 |
| 2,610,501 | 9/1952 | Maas | 85—4 |
| 3,180,660 | 4/1965 | Brewington | 151—41.7 |

FOREIGN PATENTS 1,007,138  10/1957  Germany.

CARL W. TOMLIN, *Primary Examiner.*

R. S. BRITTS, M. PARSONS, JR., *Assistant Examiners.*